(12) United States Patent
Oakner et al.

(10) Patent No.: US 8,967,183 B2
(45) Date of Patent: Mar. 3, 2015

(54) DRAIN LINE ACCESS DEVICE

(71) Applicants: Stuart Oakner, Boca Raton, FL (US); Donna Oakner, Boca Raton, FL (US)

(72) Inventors: Stuart Oakner, Boca Raton, FL (US); Donna Oakner, Boca Raton, FL (US)

(73) Assignee: MSD Research, Inc., Boca Raton, FL (US)

( * ) Notice: Subject to any disclaimer, the term of this patent is extended or adjusted under 35 U.S.C. 154(b) by 0 days.

(21) Appl. No.: 13/953,948

(22) Filed: Jul. 30, 2013

(65) Prior Publication Data
US 2014/0109988 A1 Apr. 24, 2014

Related U.S. Application Data

(60) Provisional application No. 61/716,238, filed on Oct. 19, 2012.

(51) Int. Cl.
F16K 3/10 (2006.01)
B08B 9/027 (2006.01)
F24F 13/22 (2006.01)

(52) U.S. Cl.
CPC .............. B08B 9/027 (2013.01); F24F 13/222 (2013.01); F24F 2013/227 (2013.01)
USPC .......... 137/240; 137/521; 137/527.1; 62/303; 134/102.2; 4/227.6

(58) Field of Classification Search
USPC ......... 137/240, 238, 861, 527.2, 521; 62/285, 62/284, 303; 134/102.1, 102.2, 99.1; 4/227.6, 255.04
See application file for complete search history.

(56) References Cited

U.S. PATENT DOCUMENTS

| 730,463 | A | * | 6/1903 | Keyt | 137/240 |
|---|---|---|---|---|---|
| 1,274,103 | A | * | 7/1918 | Story | 137/240 |
| 1,885,977 | A | * | 11/1932 | Denison | 137/240 |
| 1,938,064 | A | * | 12/1933 | Carmine | 137/112 |
| 2,044,921 | A | * | 6/1936 | Swanland | 137/112 |
| 3,937,404 | A | * | 2/1976 | Johnson | 4/255.09 |
| 4,555,820 | A | * | 12/1985 | Dragstrem | 4/255.06 |
| 4,811,753 | A | * | 3/1989 | Bethune | 137/217 |
| 5,085,244 | A | | 2/1992 | Funk | |
| 5,722,458 | A | * | 3/1998 | Potter | 137/625.47 |
| 5,794,655 | A | * | 8/1998 | Funderburk et al. | 137/527 |
| 5,947,152 | A | * | 9/1999 | Martin et al. | 137/527.2 |
| 5,964,238 | A | * | 10/1999 | Junkin | 137/15.05 |
| 5,988,188 | A | * | 11/1999 | Born | 134/22.11 |
| 6,068,023 | A | * | 5/2000 | Potter | 137/625.47 |
| 6,182,677 | B1 | * | 2/2001 | Pignataro | 137/15.05 |
| 6,182,699 | B1 | * | 2/2001 | Hawkes | 137/875 |
| 6,187,105 | B1 | * | 2/2001 | Matlschweiger | 134/8 |
| 6,301,917 | B1 | * | 10/2001 | Lacoste | 62/286 |

(Continued)

Primary Examiner — John Rivell
Assistant Examiner — Minh Le
(74) Attorney, Agent, or Firm — Robert M. Downey, P.A.

(57) ABSTRACT

A drain line access device is provided for flushing HVACR drain lines. The device includes a main body having input and outlet connection ports on opposite ends for inline installation to a drain line, a flapper assembly sized and configured for seated placement in an interior cavity of the main body, and a removable top cover. The flapper assembly includes a flapper holder, a flapper, a flapper seat, and a spring hinge for rotatably urging the flapper into the normally raised position. An injection port is provided on the top cover for delivering a flow of pressurized gas or liquid for flushing out a clog in the drain line. In operation, delivery of pressurized gas or fluid into the drain line forces the flapper against the flapper seat, thereby sealing off one of the respective ends of the main body and directing the pressurized gas into the drain line.

11 Claims, 10 Drawing Sheets

(56) References Cited

U.S. PATENT DOCUMENTS

| | | |
|---|---|---|
| 6,584,995 B2 | 7/2003 | Kimbrough |
| 6,708,717 B1 | 3/2004 | Coogle |
| 6,845,527 B1 * | 1/2005 | Kohn ............................... 4/679 |
| 7,033,108 B1 * | 4/2006 | Hummert et al. ............... 405/37 |
| 7,624,756 B1 | 12/2009 | Coogle |
| 7,686,034 B1 * | 3/2010 | Coogle ......................... 137/558 |
| 7,828,011 B2 * | 11/2010 | Huet ............................. 137/521 |
| 7,930,898 B2 | 4/2011 | Laufenberg et al. |
| 8,261,771 B2 * | 9/2012 | Witkowski et al. ......... 137/527.2 |
| 8,567,435 B2 * | 10/2013 | Meyer ........................... 137/527 |
| 8,746,479 B2 * | 6/2014 | Keefer et al. ................ 220/86.3 |
| 2003/0010381 A1 | 1/2003 | Kimbrough et al. |
| 2003/0155009 A1 * | 8/2003 | Tanomwongtai ............. 137/240 |
| 2005/0067017 A1 * | 3/2005 | Condon et al. ............... 137/360 |
| 2006/0081292 A1 | 4/2006 | Samo et al. |

\* cited by examiner

DRAIN LINE ACCESS DEVICE

This patent application is based on provisional patent application Ser. No. 61/716,238 filed on Oct. 19, 2012.

BACKGROUND OF THE INVENTION

1. Field of the Invention

This invention relates to a device for cleaning drain lines and other fluid transfer conduits and, more particularly, to an inline device that is particularly suited for cleaning and removing clogs in air conditioning and refrigeration condensate drain lines.

2. Discussion of the Related Art

In various systems and equipment, there is a need to transfer and/or drain liquid from the equipment to a separate location. For example, in air conditioning and refrigeration systems, condensation naturally occurs as warm, humid air passes over the exterior of the evaporator coil in the HVACR unit. Typically, the condensation drips from the evaporator coil into a condensate collection pan positioned below the evaporator coil. From the collection pan, the liquid condensate is directed through a drain line that leads to an appropriate discharge location, such as the exterior of a building. It is not uncommon for these and other types of drain lines to occasionally become partially or completely clogged, resulting in a backup of condensate liquid in the drain line and the collection pan of the HVACR unit. In particular, the slow and continuous movement of condensate liquid through the drain line (i.e., by gravity transfer) encourages the growth and accumulation of algae, bacteria, dust, corrosive residue and other debris that builds up in the drain line and eventually causes a partial or complete blockage. The backup of condensate in the drain line and collection pan can result in an accidental overflow of condensate during the continuous operation of the HVACR equipment, possibly resulting in extensive and costly damage to the building structure and contents. This is a common problem that is well known in the industry.

In order to avoid clogs and accidental condensate overflows in HVACR condensate drain lines, it is recommended that the drain lines be cleaned (i.e., cleared of debris and residue) at least twice a year during normal maintenance procedures. Typically, cleaning of drain lines is achieved by introducing a pressurized flow of liquid or gas through one end of the drain line which serves to push debris, residue and blockages through the drain line and out through the opposite end. In most instances, when using a pressurized flow through the drain line for cleaning, it is desirous to gain access to the upper end of the condensate drain line near the air conditioner or refrigeration unit so that the pressure may be applied at the upper end, while pushing the clogging materials out through the opposite end, usually at an exterior of the building. Access to the upper end of the drain line requires detaching the drain line from the air conditioning or refrigeration unit and then replacing the drain line wherein the maintenance is completed. In many instances, access to the drain line can only be achieved by cutting the drain line near the HVACR unit to create an open end for injection of a pressurized gas or fluid. After cleaning, the cut drain line must then be repaired by inserting a connecting joint. This repair process compromises the water tight integrity of the drain line, and can often result in leaks at the repair joint.

In order to overcome the above-described problems associated with drain line clogs and maintenance for cleaning drain lines in HVACR systems, others have proposed for the installation of permanent inline assemblies that allow for access to the drain line to inject pressurized gas or liquid without the need of separating the drain line from the equipment or cutting the drain line. These various inline assemblies typically employ the use of a manually operated ball valve or gate valve that is closed during the clean out procedure so that the forced flow of gas or liquid is directed in one direction, usually away from the HVACR equipment. Use of a valve is advantageous in order to close off the drain line between the valve and a clog in the line. The pressurized flow of gas or liquid can then be introduced into the drain line between the closed valve and the clog, creating sufficient pressure to push the clog out through the line until the drain line is completely cleared of debris and clogging residue. After the cleanout procedure, the manually operated valve must be opened by the service person, otherwise the closed valve will act as a clog by preventing flow and draining of condensate liquid through the drain line to the desired discharge location.

The need to operate a manual shut-off valve in the various inline drain flushing systems of the related art presents several problems. In particular, the rotational force exerted on the manual valve control can cause bending or breaking of the drain line pipe and/or connecting joints, especially over time when the valve accumulates residue and tends to stick and resist movement. Eventually, the valve would need to be replaced which requires cutting the drain line at two locations. Another major concern with use of manually operated shut-off valves along an HVACR drain line is human error. If the service person forgets to re-open the valve after cleaning the drain line, the liquid condensate will not be permitted to drain out from the drain line and will, instead, back up into the HVACR unit drain pan, possibly resulting in an accidental overflow as the HVACR unit continues to operate.

An attempt to address the above-stated problems can be found in U.S. Pat. No. 7,930,898 to Laufenberg, which discloses an A/C drain line device that allows for flushing of blockages in the drain line. The Laufenberg device includes a flapper that normally hangs straight down and is always in partial obstruction to the drain line. A stop member limits opening of the flapper so that the flapper remains a partial obstruction to the drain line during flushing of blockages. The partial obstruction created by the Laufenberg flapper can cause blockages if debris or a clog from upstream is moved through the drain line and can't pass through the reduced sized passage caused by the partial obstruction of the flapper. International Mechanical Code section 307.2.2 states, in part, that the condensate waste and drain line shall not decrease in diameter size from the drain pan connection to the place of the condensate disposal. The Laufenberg device does not allow for injection of pressurized air/gas, liquid or vacuum force in the opposite upstream direction to clean clogs between the condensation producing source (e.g., HVAC unit) and the Laufenberg device. A further limitation of the Laufenberg device is the inability to remove the flapper to allow for connection of an adapter to direct a pressurized flow of air/gas, liquid or vacuum force in the upstream direction (or downstream direction). Moreover, the Laufenberg flapper cannot be removed for cleaning or replacement. Additionally, the Laufenberg device does not permit full, unobstructed inline access to the drain line. Access is provided through a tubular member of the Y-shaped device which limits access to the drain line.

Therefore, with the foregoing reasons in mind, there exists a need for a drain line access device that is structured for inline installation to an existing drain line without obstructing the flow of drain line contents, and which permits convenient flushing of the drain line in both upstream and downstream directions.

OBJECTS AND ADVANTAGES OF THE INVENTION

Considering the forgoing, it is a primary object of the present invention to provide inline access to fluid transfer lines, such as drain lines in HVACR systems, for purposes of cleaning (e.g., flushing) the lines without disrupting the integrity of the lines and without the need to manually operate shut-off valves to perform the cleaning.

It is a further object of the present invention to provide a drain line access device that allows for easy connection of a compressed gas delivery source to clean the line and clear any clogs, and wherein an automatic check valve is normally open and only closes during the introduction of a pressurized gas or fluid flow from the connected compressed gas delivery source.

It is still a further object of the present invention to provide a drain line access device for cleaning fluid transfer lines and clearing clogs either upstream or downstream of the device.

It is yet a further object of the present invention to provide a drain line access device that has an easily removable cover for providing convenient access and ease of removal and replacement of parts of the device and insertion of adapters for flushing the drain line in either direction without cutting, damaging or disrupting the fluid transfer line (e.g., drain line).

SUMMARY OF THE INVENTION

The present invention is directed to a drain line valve device for clearing HVACR drain lines. The device includes a main valve body having connection ports on opposite ends for inline installation to a drain line (between the condensation producing source and drain discharge). In one embodiment, the device further includes a flapper assembly that is sized and configured for insertion into an interior cavity of the main valve body, and a removable top cover. The flapper assembly includes a flapper holder, a flapper, a flapper seat, and a spring hinge for rotatably urging the flapper away from the flapper seat and into the normally raised position. An injection port (e.g., a normally closed valve with a depressible valve stem core) is provided on the top cover for delivering a flow of pressurized gas or liquid for flushing out a clog in the drain line. In operation, delivery of pressurized gas or fluid into the drain line forces the flapper against the resistance of the spring hinge and against the flapper seat, thereby sealing off the respective end of the main body and directing the pressurized gas or fluid in the opposite direction into the drain line. The flapper assembly is removable for cleaning or replacement. An adapter is provided and is sized and configured for insertion into the interior cavity of the main body (when flapper assembly is removed) and fitted receipt within the inside of one of the input or outlet ports in order to allow for connection of virtually any pressurized gas or liquid flow source, or a vacuum source, as well as pouring of a liquid (e.g. unclogging liquid) either upstream or downstream in the drain line. In a further embodiment, the drain line access device includes two opposing flapper assemblies for selective delivery of a flow of pressurized gas in either direction (i.e., upstream or downstream) of the drain line for clearing a clog between the device and either of the condensation producing source or drain discharge.

BRIEF DESCRIPTION OF THE DRAWINGS

For a fuller understanding of the nature of the present invention, reference should be made to the following detailed description, taken in conjunction with the accompanying drawings in which.

Like reference numerals refer to like reference parts throughout the several views of the drawings.

DETAILED DESCRIPTION OF THE PREFERRED EMBODIMENT

Figure 1:
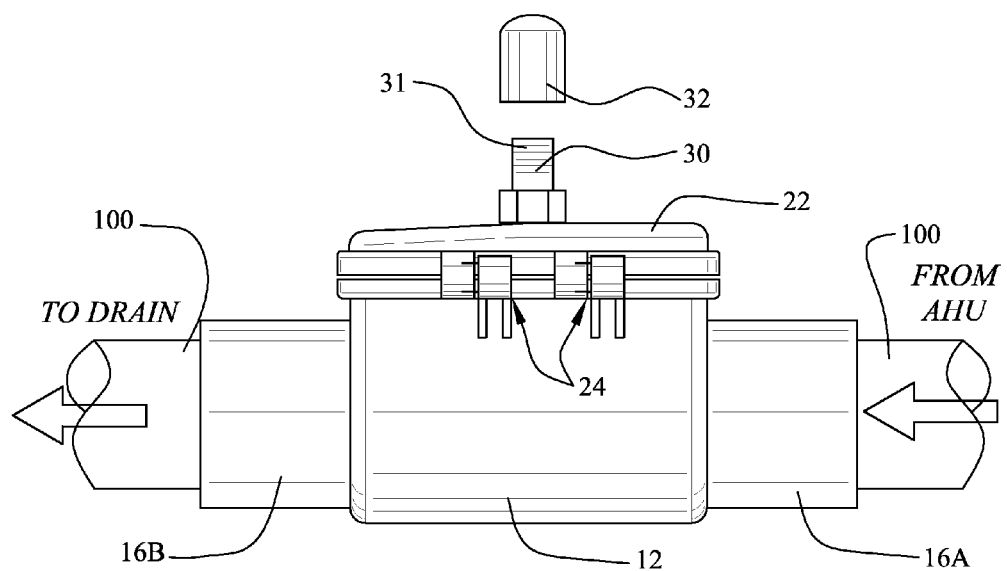
FIG. 1 is a side elevational view showing the drain line access device of the present invention installed inline to a drain line between a condensation producing source (e.g., an air handler unit of an HVACR system) and a drain discharge, wherein the drain line is shown in cut-away on opposite sides of the device.

Referring to the several views of the drawings, the drain line access device of the present invention for clearing HVACR drain lines 100 is shown and is generally indicated as 10.

Referring initially to FIGS. 1-6, the device 10 includes a main valve body 12 surrounding interior cavity 14 and having top opening 15 and input and outlet connector ports 16A and 16B on opposite ends, each being sized and configured for engaged receipt of opposing ends of drain line 100 for inline installation. In one embodiment, input port 16A is sized and configured for engaged receipt of drain line 100 extending from a condensation producing source (e.g., an air handler unit of an HVAC unit) and outlet port 16B is sized and configured for engaged receipt of drain line 100 extending to a drain. Each connector port 16A and 16B includes an annular shoulder 18 sized and configured for coming into abutment with the distal end of drain line 100 when connected to a respective connector port 16A or 16B of the valve body 12. Flapper assembly 20 is sized for engaging interior cavity 14, and is accessible through top opening 15 when top cover 22 is in the open position. Top cover 22 is hingedly secured to one side of the valve body 12 by double pin separating hinge assembly 24, including removable male hinge members 25A and female hinge members 25B. The top cover 22 is releasably secured to valve body 12 by a latch mechanism 26 on the side opposite the hinge assembly 24. Top cover 22 is sized and configured to seal the open top of valve body 12 when in the closed position to form an inner channel 28 between input and outlet connector ports 16A and 16B and opposing ends of drain line 100. An injection port 30, such as a tubular bore fitted with a depressible valve stem core that is normally closed, allows for easy delivery of pressurized air/gas flow or pressurized liquid and prevents any air or liquid from exiting the interior cavity 14 of valve body 12. In one embodiment, injection port 30 includes a threaded exterior surface 31 sized to receive a threaded cap 32 when the drain 100 is not being flushed in order to close the injection port 30. In one embodiment, the cap 32 includes a gasket for sealing the injection port 30.

Figure 2:
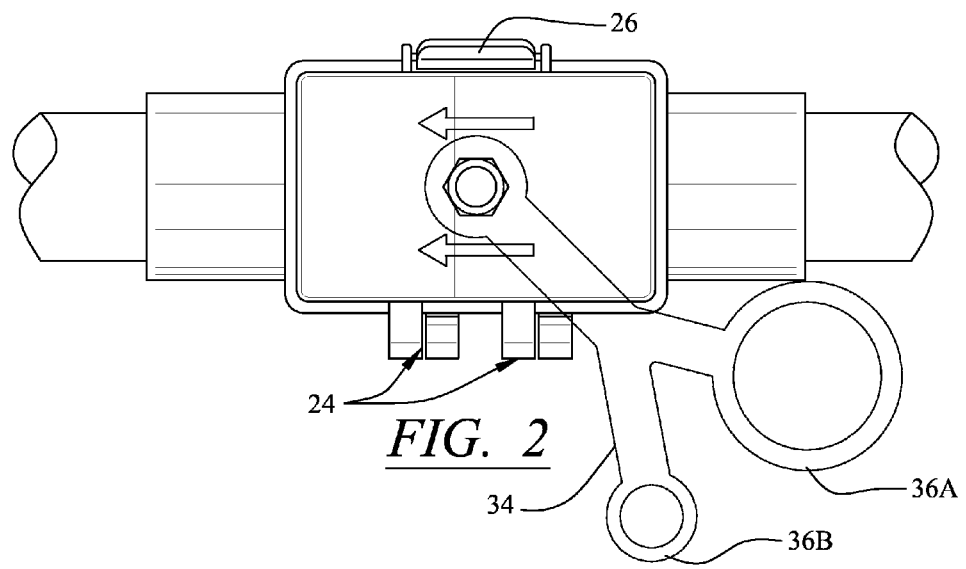
FIG. 2 is a top plan view of the drain line access device of FIG. 1, shown with an adapter holder installed on a cover of the device.
Figure 3:
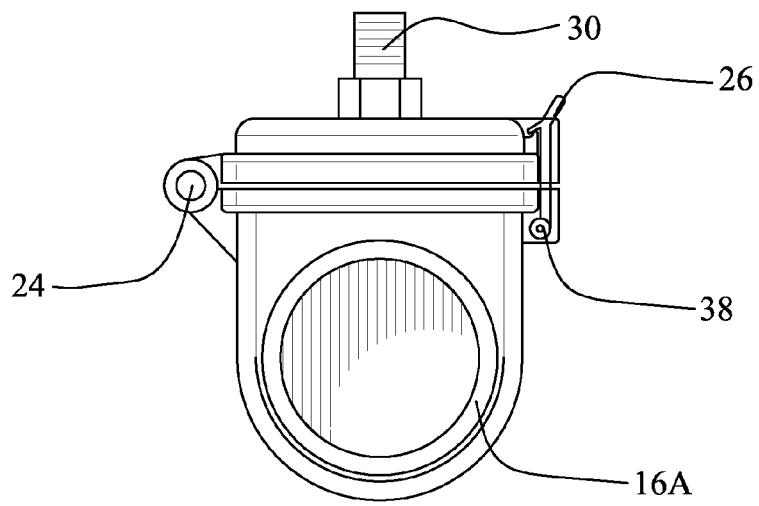
FIG. 3 is an end elevational view shown from the input end of the drain line access device of the present invention.
Figure 4:
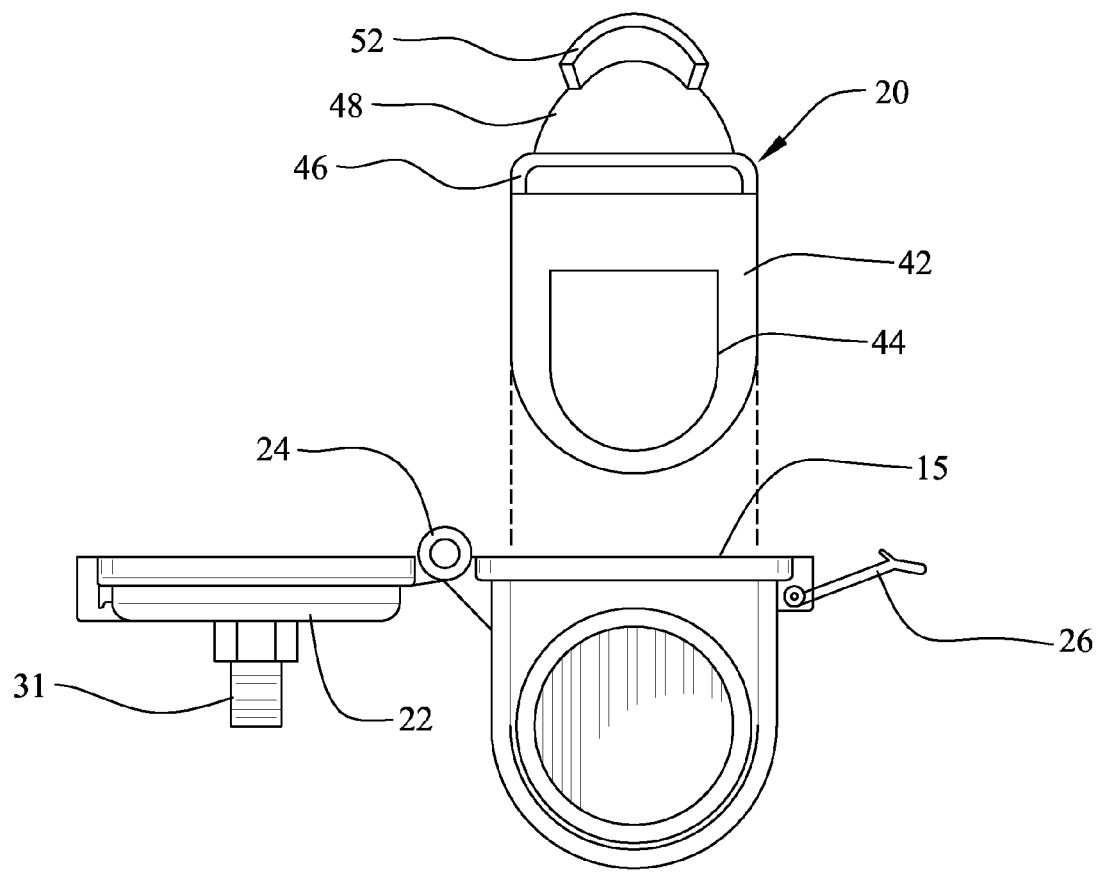
FIG. 4 is an end elevational view of the drain line access device of FIG. 3, shown partially exploded, with the top cover open and a flapper assembly removed from the main body of the device.
Figure 5:
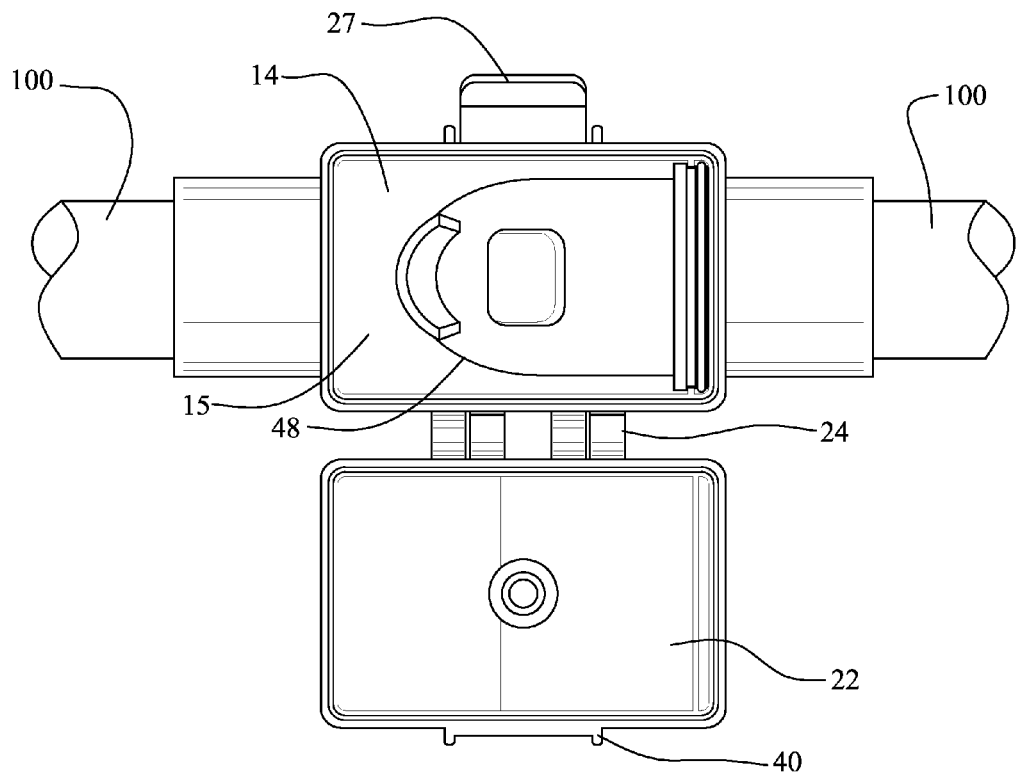
FIG. 5 is a top plan view of the drain line access device of FIG. 1 shown with the top cover open and attached to the main body of the device by a hinge assembly.
Figure 6:
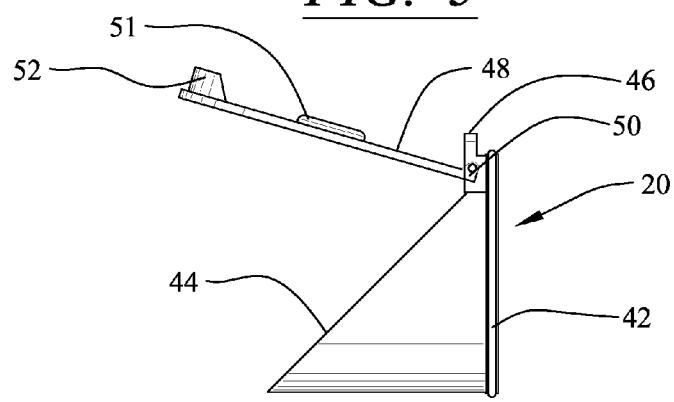
FIG. 6 is an isolated side elevational view of the flapper assembly with a flapper shown in the normally raised position.

Specifically referring to FIG. 2, a holder 34 is securable to injection port 30 and includes loops 36A and 36B for stowing adapter 60 (FIG. 10) and flapper closing fitting 64 (FIG. 13), respectively, when the adapter 60 and flapper closer fitting 64 are not in use. Loop 36C is provided for securing holder 34 to injection port 30.

Referring to FIGS. 3-6, the latch mechanism 26 includes latch 27 which is rotatable about pin 38 and can be latched to fastening member 40 on top cover 22 for sealing top opening 15. To open top cover 22, latch 26 can be unlatched from fastening member 40 and rotated away from top cover 22 about pin 38 to allow for top cover 22 to be opened, wherein top cover 22 is rotated about double pin separating hinge assembly 24.

Flapper assembly 20 includes a flapper holder 42 sized for congruent receipt against the inner walls of valve body 12 forming interior cavity 14 and includes a flapper seat 44 surrounding flapper opening 45 configured for alignment with input and outlet connector ports 16A and 16B when flapper assembly 20 is fully inserted and seated within the interior cavity 14. A handle 46 is provided on flapper holder 42 and is sized and configured for grasping by the fingers of a user when inserting or removing flapper assembly 20. A flapper 48 is rotatably urged away from flapper seat 44 and to a fully raised position by spring hinge 50 for maintaining the inner channel 28 completely unobstructed when a drain clog is not being flushed. The spring hinge 50 is structured to maintain the flapper 48 in the fully raised position and in abutment with the underside of the top cover 22. Accordingly, the flapper 48 is normally held in the up (i.e., fully open) position to allow liquid to flow through the device 10 without obstruction, thereby defining a normally open inner channel 28. In one embodiment, a sealing pad 51 on the top side of the flapper 48 is sized and configured for sealing the bottom side of injection port 30 on the underside of top cover 22 when the flapper 48 is in the normally raised position. Cup-shaped member 52 at the distal end of flapper 48 is configured for catching the flow of pressurized gas from a compressed gas source (FIG. 9) in order to force the flapper 48 down against the flapper seat 44 and in the closed position when a drain clog is being flushed.

The flapper assembly 20 is removable to permit pouring of a liquid into the drain line 100, as well as for cleaning or replacement of the flapper assembly 20. An adapter 60 (FIG. 10) having a hollow interior channel bent at a 90-degree angle is configured for insertion into the interior cavity 14 to facilitate pouring of a liquid into the drain line 100, wherein one end connects with an inner facing side of one of connector port 16A or 16B and the opposite end of the adapter 60 receives the liquid.

Figure 7:
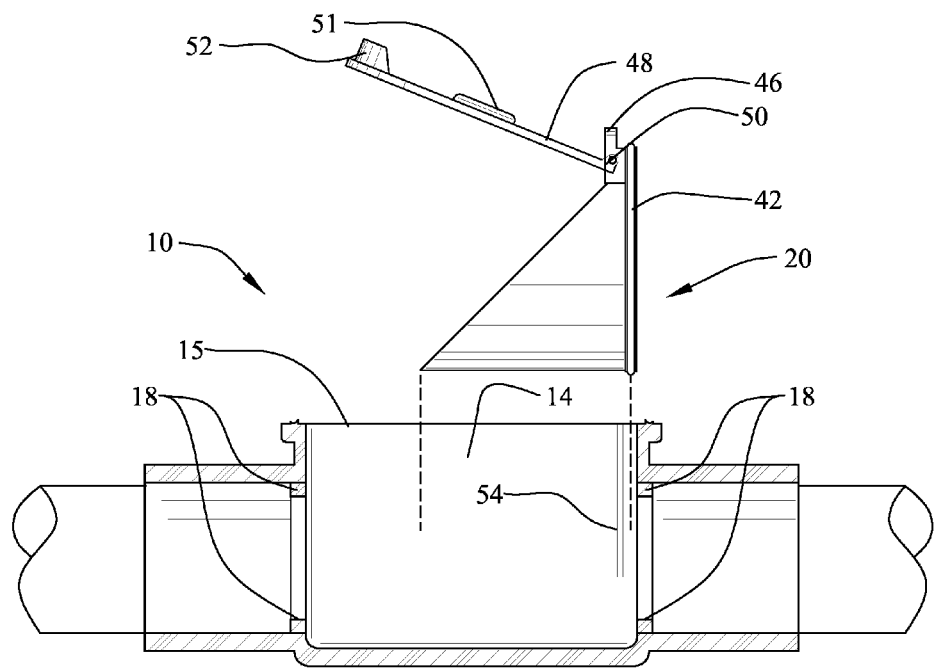
FIG. 7 is a side elevational view, shown in partial cross-section, illustrating the drain line access device installed inline to a drain line with the top cover of the device removed and the flapper assembly lifted from the main body of the device.

Referring to FIG. 7, the flapper holder 42 includes a seal or gasket 53 fitted about an outer rim which, when flapper holder 42 is installed in interior cavity 14 of valve body 12, serves to produce a seal where the flapper holder 42 and input port 16A are connected. Tracks 54 are provided on opposite sides of the inner facing surface of the valve body 12 and are configured for receiving a portion of the flapper holder 42 to secure flapper assembly 20 in interior cavity 14.

Figure 8:
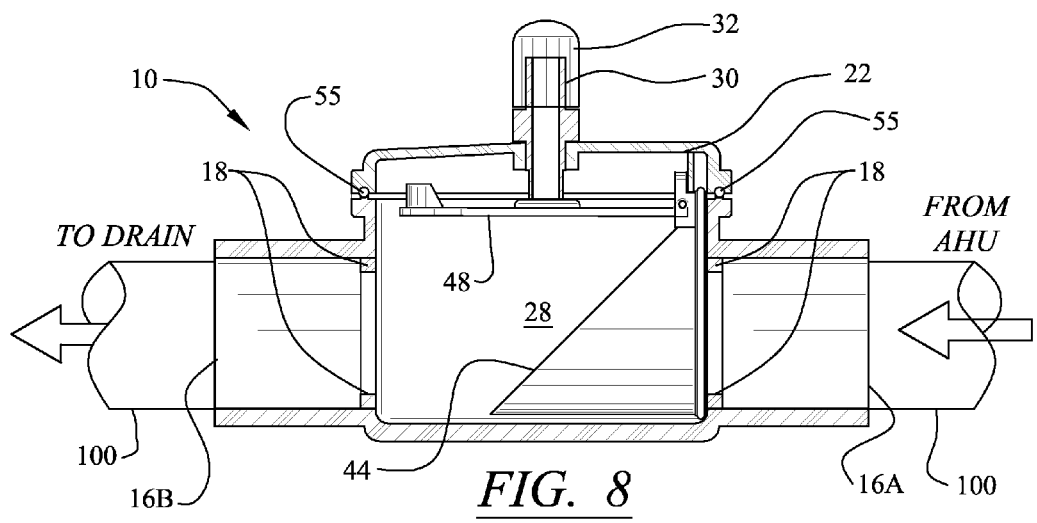
FIG. 8 is a side elevational view, shown in partial cross-section, illustrating the drain line access device installed inline to a drain line and in a normal operational condition with the flapper raised, allowing unobstructed condensate liquid flow through the device.
Figure 9:
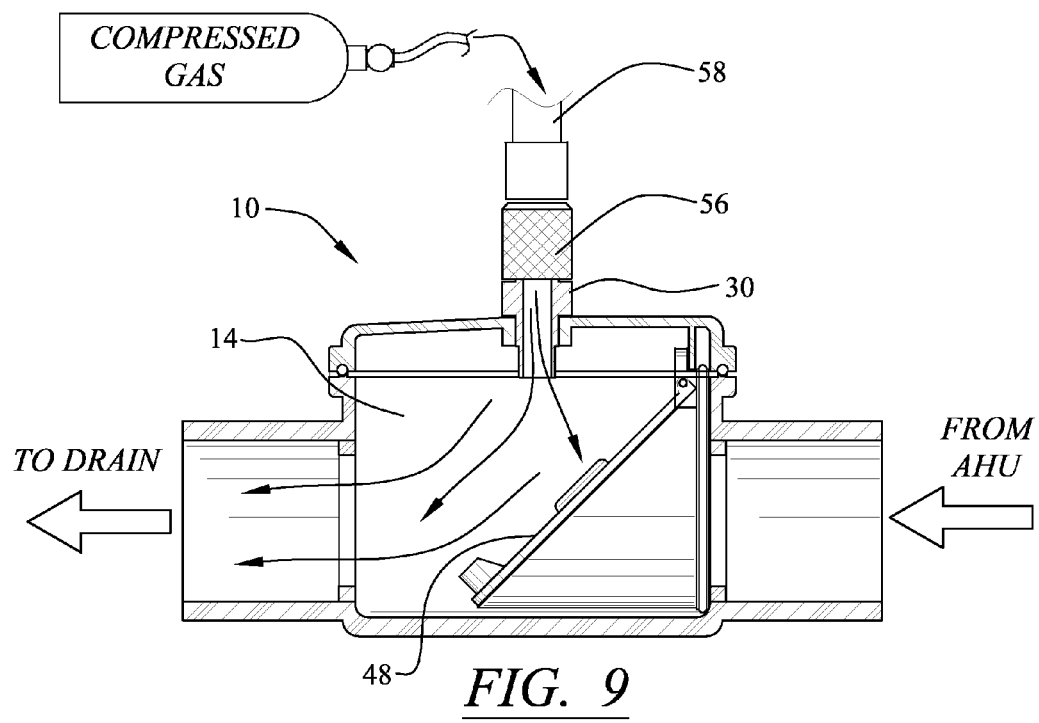
FIG. 9 is a side elevational view, shown in partial cross-section, illustrating injection of a pressurized gas from a compressed gas source through an injection port in the top cover of the device, causing the flapper to close against the flapper seat and directing the pressurized flow of gas downstream through the drain line to the drain discharge, while the flapper blocks flow of the pressurized gas in the opposite, upstream direction of the drain line.

Referring to FIGS. 8 and 9, the drain line valve and access device 10 is installed inline to a drain line 100 and operational when top cover 22 is in the closed position and inner channel 28 is unobstructed extending between input and outlet connector ports 16A and 16B for allowing condensate liquid to flow therethrough. Top cover seal 55 is provided for sealing the connection between top cover 22 and top opening 15 when top cover 22 is in the closed position. To flush a clog in drain line 100, cap 32 is removed to expose injection port 30 and pressurized gas is injected from a compressed gas source into injection port 30. As shown in FIG. 9, the flow of pressurized gas/air causes flapper 48 to close against the flapper seat 44 and direct the pressurized flow of gas/air downstream through the outlet connector port 16B and drain line 100, while the flapper 48 blocks flow of the pressurized gas in the opposite, upstream direction of the drain line 100. A coupling 56 is provided for linking the injection port 30 with a hose 58 in communication with the compressed gas source. Alternatively, a pressurized liquid source (e.g. water hose) can be attached to the injection port 30 to direct a pressurized flow of liquid downstream through the drain line 100 to flush a clog in the drain line 100.

Figure 10:
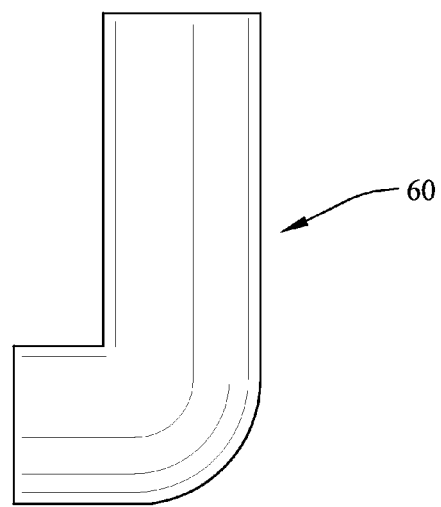
FIG. 10 is a side elevational view of an adapter for use in conjunction with the drain line access device of the present invention.
Figure 11:
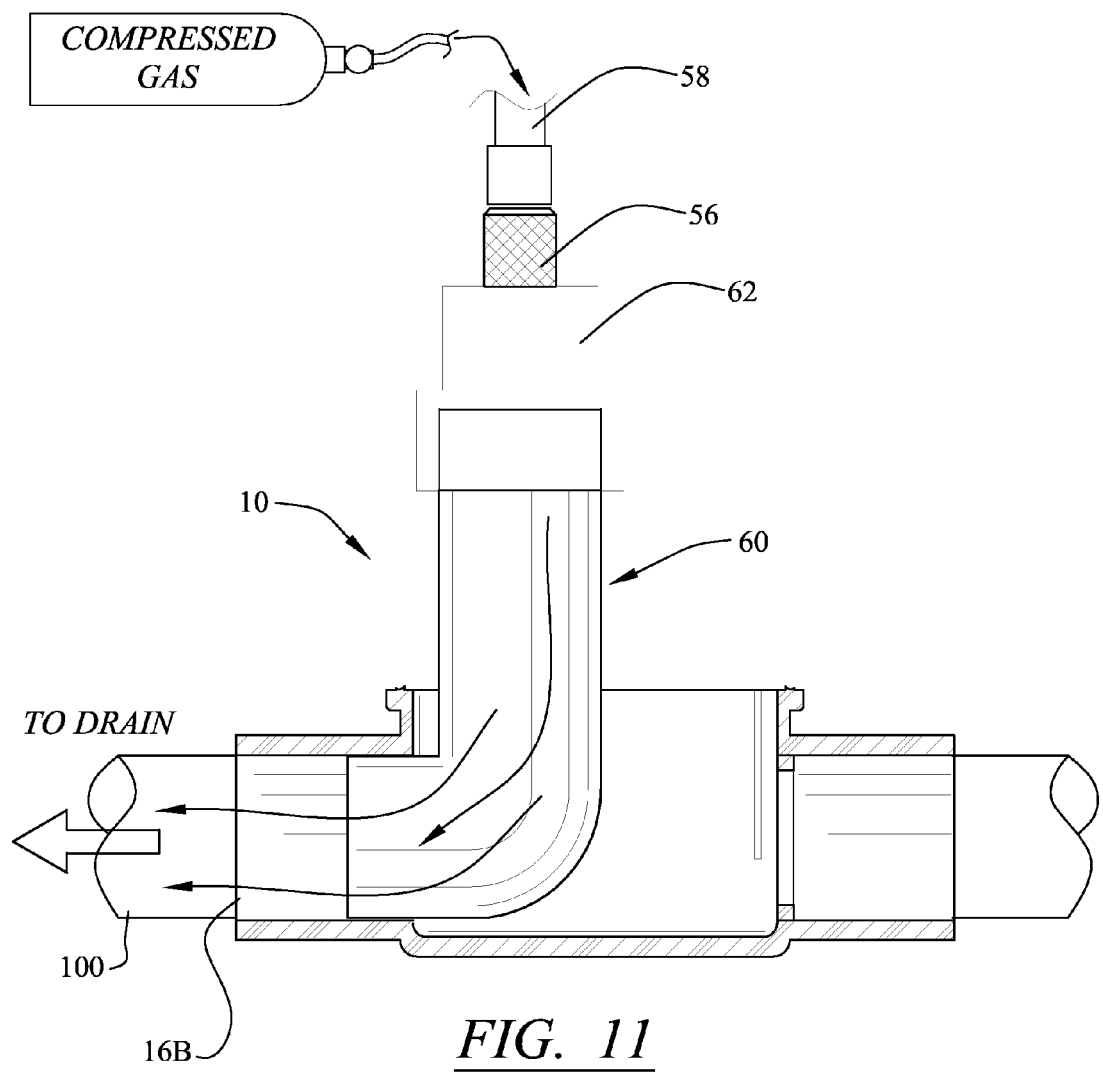
FIG. 11 is a side elevational view, shown in partial cross-section, showing the adapter of FIG. 10 installed within the main body of the device with the top cover removed and a compressed gas source attached to the top of the adapter for directing a pressurized flow of gas through the adapter and downstream through the drain line to the drain discharge while preventing flow of the pressurized gas in the opposite, upstream direction of the drain line.

Referring to FIGS. 10 and 11, an adapter 60 may be used in conjunction with the valve body 12 in order to facilitate pouring a liquid into the drain line 100. The adapter 60 includes a 90-degree angle and is sized and configured to be partially inserted into interior cavity 14 through top opening 15. One end of the adapter 60 engages one of the input or outlet connector ports 16A or 16B to allow for easy pouring of the liquid into the opposite end of the adapter 60. While the adapter 60 shown and described includes a 90-degree bend, the angle of the bend on adapter 60 could be between 0-degrees and 180-degrees.

In an alternative embodiment of the device 10, as shown in FIG. 11, a valve fitting 62 may be used in conjunction with the adapter 60 for flushing a clog in drain line 100 when the flapper assembly 20 is removed from the valve body 12. The flow of pressurized gas is directed from a compressed gas source through the hose 58, coupling 56, valve fitting 62, and adapter 60 and then enters the outlet connecter port 16B, which is in connection with drain line 100, for flushing out the clog.

Figure 12:
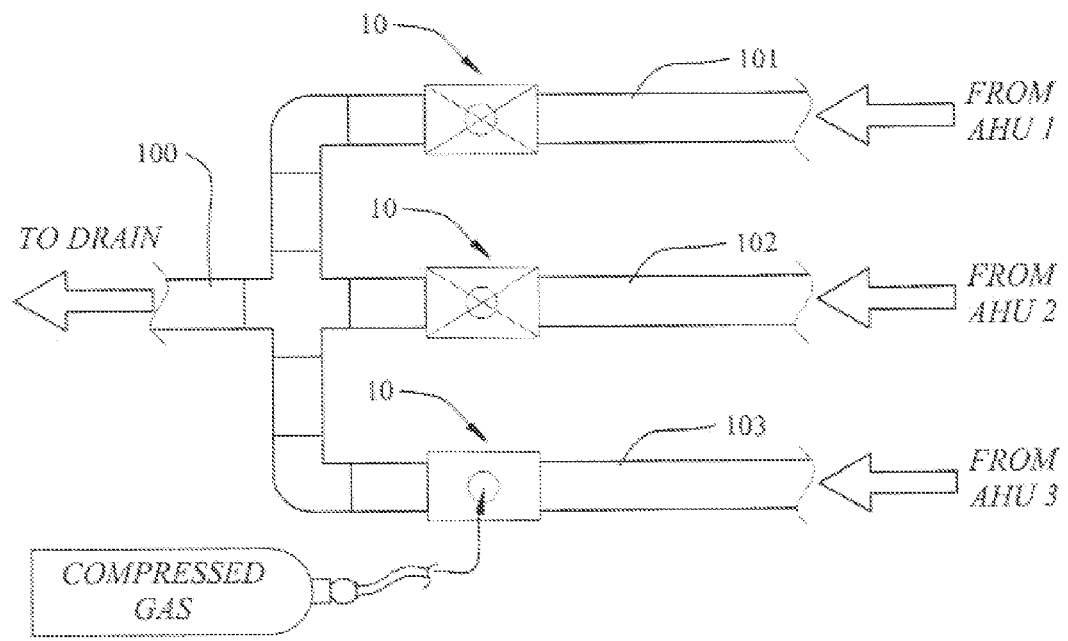
FIG. 12 is a schematic illustration showing a drain line system having multiple drain line branches each extending to a separate condensation producing source (e.g., an air handler unit of a HVAC system), wherein a separate one of the drain line access device of the present invention is installed to each drain line branch extending to the separate condensate producing sources, and wherein a pressurized flow of gas is attached to one of the devices while the remaining valve and access devices are maintained with the flapper in the closed position to prevent backflow of the pressurized gas upstream to the branch drain lines.

Referring to FIG. 12, multiple drain line valve and access devices 10 may be installed in an HVACR system having multiple drain line branches. For example, HVACR systems including separate condensation producing sources on multiple floors of a building have devices 10 on each floor installed inline along branched drain lines 101, 102 and 103, as shown in FIG. 12. To flush a clog in drain line 100 or between drain line 100 and one of branched drain lines 101, 102 or 103, a compressed gas source is attached to one of the devices 10 while the remaining devices 10 are maintained with the flapper in the closed position to prevent backflow when a pressurized flow of gas is introduced to one of the branched drain lines 101, 102 or 103.

Figure 13:
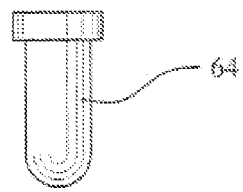
FIG. 13 is a side elevational view of a flapper closer fitting for use in conjunction with the drain line access device of the present invention for holding the flapper closed such as in the drain line system of FIG. 12.
Figure 14:
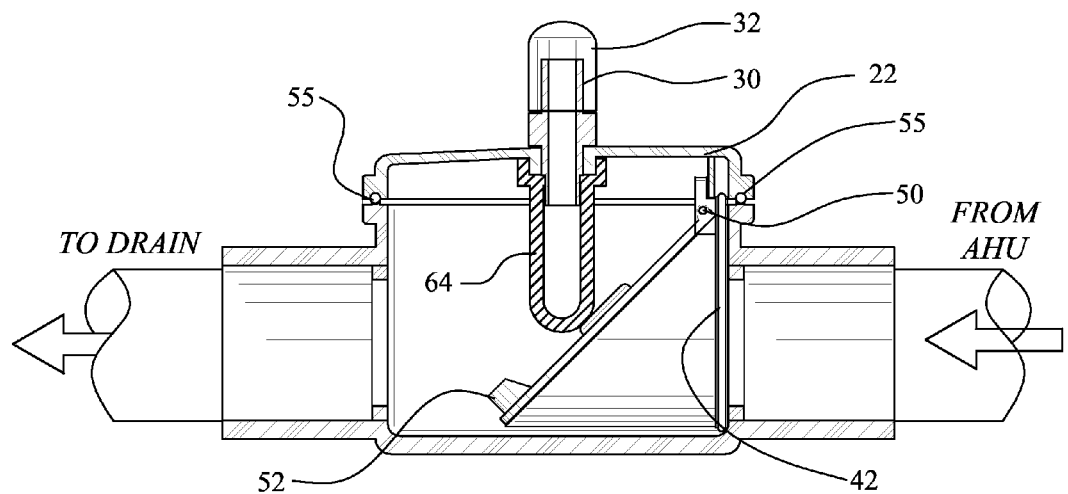
FIG. 14 is a side elevational, shown in partial cross-section, with the drain line access device shown installed inline to a drain line and the flapper closer removably fitted to the bottom end of the injection port on the underside of the top cover of the device to thereby hold the flapper in the closed position.

Referring to FIGS. 13 and 14, a flapper closer fitting 64 is configured for use in conjunction with the flapper assembly 20 for keeping the flapper 48 in the closed position against flapper seat 44. As shown in FIG. 14, the flapper closer fitting 64 is removably fitted to the bottom end of injection port 30 on the underside of top cover 22, wherein the flapper closer fitting 64 is in contact with flapper 48 for keeping the flapper 48 in the closed position against flapper seat 44.

Figure 15:
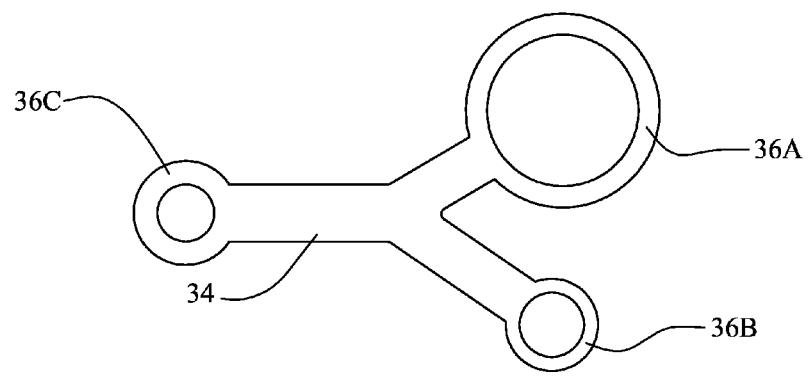
FIG. 15 is a top plan view of the adapter holder of FIG. 2 for stowing the adapter and flapper closer on the device when the adapter and flapper closer are not in use.

Referring to FIG. 15, holder 34 includes loop 36A for holding adapter 60, loop 36B for holding flapper closer fitting 64, and loop 36C for securing holder 34 to injection port 30.

Figure 16:
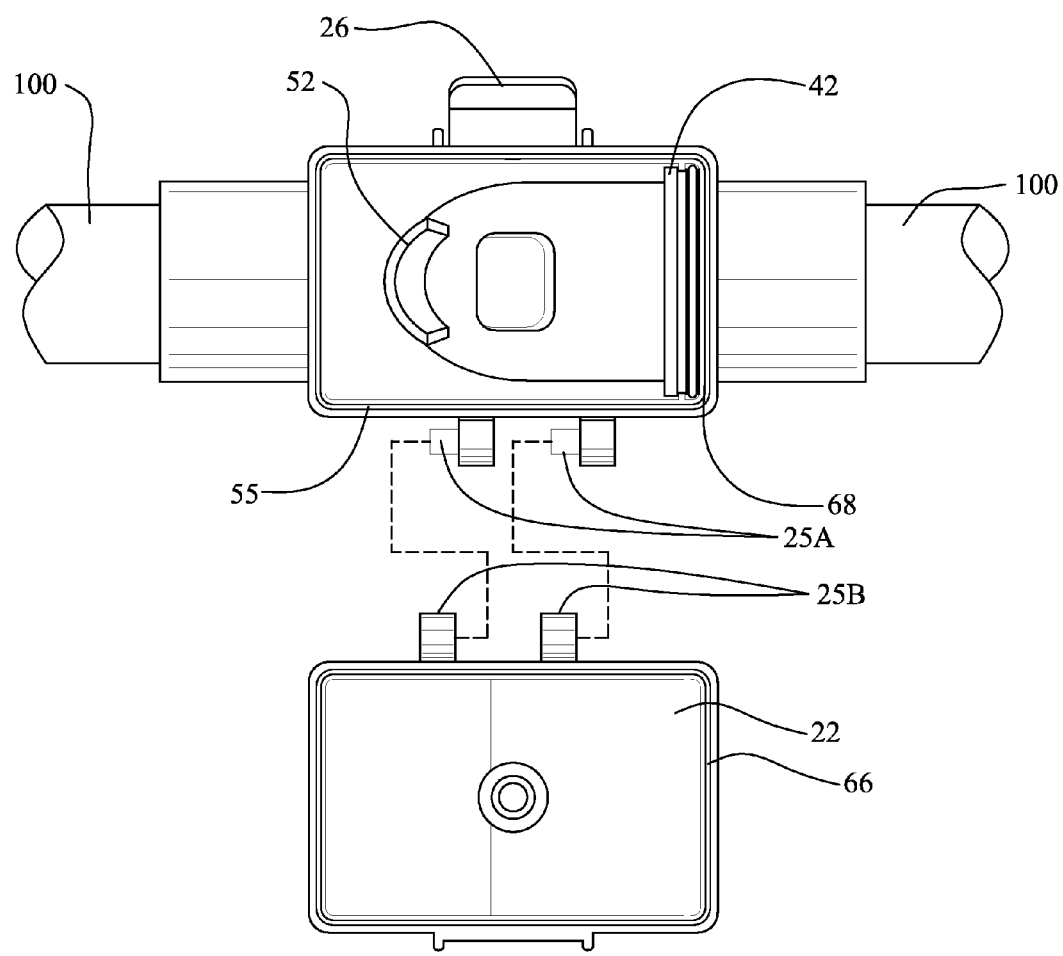
FIG. 16 is an exploded top plan view of the drain line access device shown installed inline to a drain line with the top cover removed from the main body by separation of female hinge members from male hinge members of the double pin hinge assembly.

Referring to FIG. 16, top cover 22 includes groove 66 for receiving top cover seal 55 when top cover 22 is closed against the top edge 68 of valve body 12. Top cover 22 is easily removable from valve body 12 by taking out male hinge members 25A of double pin separating hinge assembly 24 from female hinge members 25B.

Figure 17:
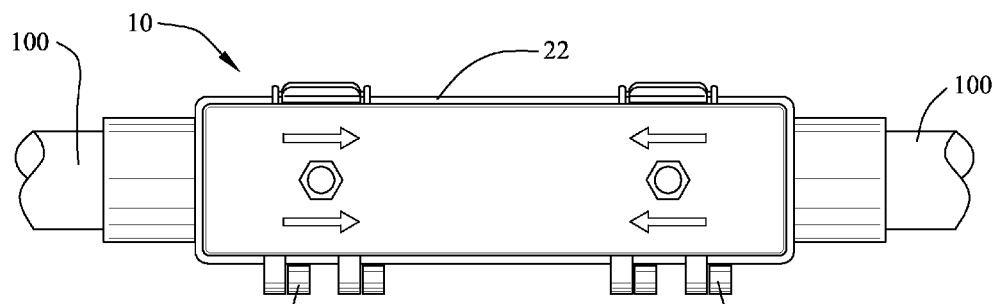
FIG. 17 is a top plan view illustrating an alternative embodiment of the drain line access device of the present invention.
Figure 18:
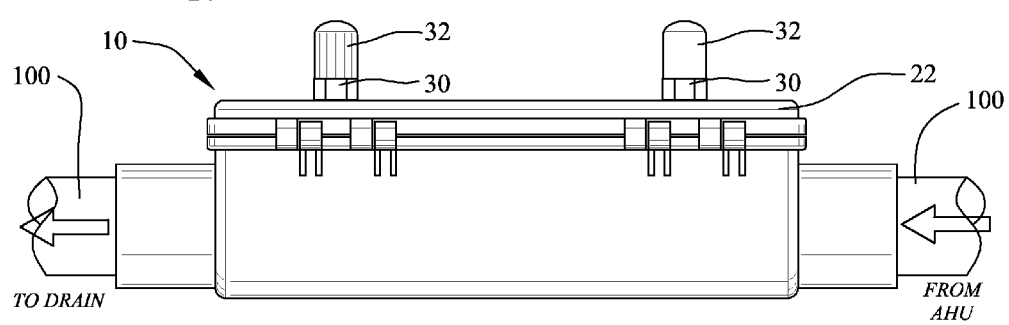
FIG. 18 is a side elevational view of the drain line access device of FIG. 17.
Figure 19:
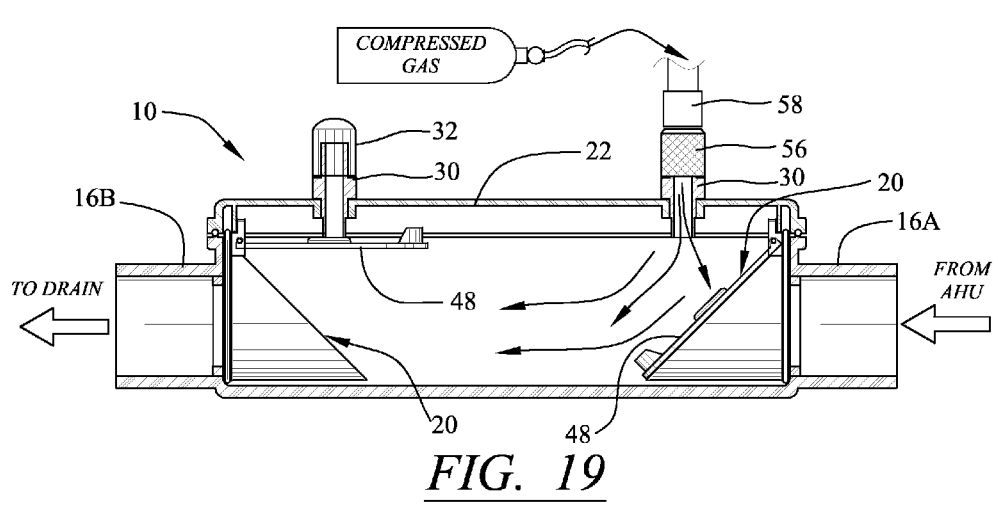
FIG. 19 is a side elevational view, shown in partial cross-section, showing the drain line access device of FIG. 17, wherein the device includes two separate flapper assemblies at each end and two injection ports on the top cover, each associated with one of the flapper assemblies, wherein injection of pressurized gas or liquid flow through the right injection port serves to close the right flapper and direct the pressurized flow of gas or liquid downstream through the drain line to the drain discharge, while injection of pressurized gas or liquid through the left injection port would serve to close the left flapper and direct the pressurized flow of gas or liquid upstream through the drain line towards the condensation producing source (e.g., HVAC air handler unit).

Referring to FIGS. 17-19, a further embodiment of the drain line valve and access device 10 includes two opposing flapper assemblies 20 at each end of an extended flapper holder 42. The opposing flapper assemblies 20 permit flushing of drain line 100 in either direction (i.e. towards the condensation producing source or, alternatively, the drain discharge), wherein injection of pressurized gas (or liquid) from a compressed gas source through one of the injection ports 30 serves to close the respective flapper 48 and direct the pressurized flow of gas through the drain line. For example, as shown in FIG. 19, injection of pressurized gas from a compressed gas source through the right injection port 30 serves to close the right flapper 48 and direct the pressurized flow of gas downstream through the drain line 100 to the drain discharge.

While the present invention has been shown and described in accordance with several preferred and practical embodiments, it is recognized that departures from the instant disclosure are contemplated within the spirit and scope of the present invention which are not to be limited except as defined in the following claims as interpreted under the Doctrine of Equivalents.

What is claimed is:

1. An access device for inline installation on a drain line between a condensation producing source and a drain discharge, and said device comprising:

a main body having an inner wall surface extending to an inner bottom surface and surrounding an interior cavity, and said main body including an input connecting port sized and configured for sealed connection with the drain line and an outlet connecting port sized and configured for sealed connection with an opposite facing end of the drain line, and a flow passage extending through said interior cavity between said input and outlet connecting ports and the flow passage being at least as large as a cross-sectional dimension of an interior flow passage of the drain line;

an injection port being structured and disposed for receiving a flow of pressurized gas or liquid and delivering the flow of pressurized gas or liquid into the interior cavity;

a removable flapper valve assembly comprising a flapper and a flapper holder having a flapper seat in the interior cavity of said main body, said flapper being in a normally raised position adjacent to said injection port and removed from a flow of drain line contents through the flow passage, and said flapper being structured and disposed for being forced downwards and away from said injection port and to a closed position when the flow of pressurized gas or liquid enters the interior cavity through said injection port for sealing the input connection port closed and blocking flow of the drain line contents from the input connecting port into the flow passage and directing the flow of pressurized gas or liquid through the opposing outlet connecting port and into the drain line; and a sealing pad on said flapper and being sized and configured for sealing the underside of said injection port when said flapper is in the normally raised position.

2. The device as recited in claim 1 further comprising a cup-shaped member at a distal end of said flapper, and said cup-shaped member being structured and disposed for catching the flow of pressurized gas or liquid in order to force said flapper downwards and away from said injection port when the flow of pressurized gas or liquid enters the interior cavity through said injection port.

3. The device as recited in claim 1 further comprising an adapter having a tubular main body bent at an angle, and said tubular main body having an inner channel extending between a first open end being sized and configured for selective receipt within and engaged attachment with an inner surface of either of said input connecting port or said outlet connecting port when the flapper valve assembly being removed from the main body and a second open end being sized and configured for receiving a flow of liquid or gas therethrough.

4. The device as recited in claim 1 wherein said injection port is fitted with a depressible valve stem core which is normally closed to prevent leakage of fluids or gas.

5. The device as recited in claim 1 further comprising a flapper closer fitting that is sized and configured for being removably fitted to the bottom end of said injection port to thereby hold the flapper sealed closed in blocking relation to the input connecting port.

6. An access device for inline installation on a drain line between a condensation producing source and a drain discharge, and said device comprising:
   a main body having an inner wall surface extending to an inner bottom surface and surrounding an interior cavity, and said main body including an input connecting port sized and configured for sealed connection with the drain line and an outlet connecting port sized and configured for sealed connection with an opposite facing end of the drain line, and said input and outlet connecting ports disposed in fluid flow communication with said interior cavity and defining a flow passage extending through said interior cavity and said input and outlet connecting ports;
   a top cover being releasably securable to said main body by a latch mechanism for accessing the interior cavity of said main body, and said top cover including an injection port being structured and disposed for receiving a flow of pressurized gas or liquid and delivering the flow of pressurized gas or liquid into the interior cavity; and
   a flapper assembly being sized and configured for removable insertion into the interior cavity of said main body, and said flapper assembly comprising:
      a flapper;
      a flapper holder structured for attachment to an inner facing side of said input connecting port, and said flapper holder having an outer surface wall configured for congruent receipt against the inner walls and inner bottom surface of said main body, and said flapper holder having an inner channel extending between openings at a front end and a rear end of said flapper holder;
      a flapper seat at the front end of said flapper holder;
      a spring hinge being structured and disposed for rotatably urging said flapper away from the flapper seat and into the normally raised position adjacent to said injection port and removed from the flow of drain line contents; and
      said flapper being structured and disposed for being forced against the flapper seat when the flow of pressurized gas or liquid enters the interior cavity through said injection port for sealing the inner channel of said flapper holder and directing the flow of pressurized gas or liquid through the opposing outlet connector port and into the drain line.

7. The device as recited in claim 6 further comprising a cup-shaped member at a distal end of said flapper, and said cup-shaped member being structured and disposed for catching the flow of pressurized gas or liquid in order to force said flapper down against said flapper seat when the flow of pressurized gas or liquid enters the interior cavity through said injection port.

8. The device as recited in claim 6 further comprising a sealing pad on said flapper and being sized and configured for sealing said injection port on the underside of said top cover when said flapper is in the normally raised position.

9. The device as recited in claim 6 further comprising an adapter having a tubular main body bent at an angle, and said tubular main body having an inner channel extending between a first open end being sized and configured for selective receipt within and engaged attachment with an inner surface of either of said input connecting port or said outlet connecting port when the flapper assembly being removed from the main body and a second open end being sized and configured for receiving a flow of liquid therethrough.

10. The device as recited in claim 6 wherein said injection port is fitted with a depressible valve stem core that is normally closed to prevent leakage of liquid or gas.

11. The device as recited in claim 6 further comprising a flapper closer fitting that is sized and configured for being removably fitted to the bottom end of said injection port to thereby hold the flapper sealed closed against said flapper seat.

* * * * *